United States Patent Office 3,513,184
Patented May 19, 1970

3,513,184
PARA-(DIALKYLAMINO) BENZOATES OF
ORGANOSILICON COMPOUND
Pierre Brison and Marcel Lefort, Rhone, France, assignors to Rhone-Poulenc S.A., Paris, France, a French body corporate
No Drawing. Filed Dec. 26, 1967, Ser. No. 693,082
Claims priority, application France, Dec. 23, 1966, 88,709
Int. Cl. C07f 7/10, 7/18
U.S. Cl. 260—448.2         11 Claims

ABSTRACT OF THE DISCLOSURE

The invention relates to organosilicon compounds containing one or more units of general formula

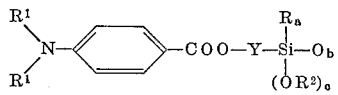

optionally associated with one or more units of general formula

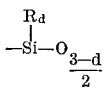

wherein $R^1$ is an alkyl group, Y is a divalent saturated hydrocarbon radical, R is an alkyl, cycloalkyl, aryl, aralkyl group, $R^2$ is an alkyl group, $a$ and $c$ are 0 to 3, $b$ is 0 when $c$ is other than 0, and is

when $c$ is 0, $a+c$ being 3 when $b$ is 0, and $d$ is 0 to 2. The invention also relates to pharmaceutical compositions containing the compounds and to a method of protecting bodies from the effects of actinic light, using them.

This invention relates to new organosilicon compounds having ester functions, to their preparation and to their use.

Some organosilicon compounds having ester functions have already been described. Thus, French Pat. No. 1,124,824 relates to siloxanes of the formula:

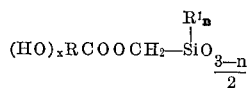

in which R represents a polyvalent hydrocarbon radical, $R^1$ represents a monovalent hydrocarbon radical, $n$ is 1 or 2 and $x$ is at least 1.

In French Pat. specification No. 1,436,378, polysiloxane resins in which from 5% to 50% of the silicon atoms are attached to radicals of the formula:

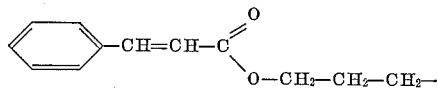

are described.

The present invention concerns organosilicon compounds containing one or more units of general Formula I

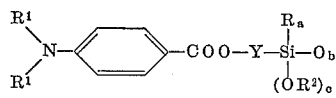

optionally associated with one or more units of general Formula IV

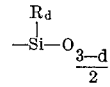

wherein $R^1$ is an alkyl group having up to 5 carbon atoms; Y is a divalent hydrocarbon group having up to 6 carbon atoms; R is an alkyl group having up to 5 carbon atoms, an unsubstituted or alkyl-substituted cycloalkyl group having 5 or 6 ring carbon atoms, an unsubstituted or alkyl-substituted aryl group, or an aralkyl group, $R^2$ is an alkyl group having up to 5 carbon atoms; $a$ and $c$ are 0 to 3; $b$ is 0 when $c$ is other than 0, and $b$ is

when $c$ is 0, $a+c$ being 3 when $b$ is 0; $d$ is 0 to 2; and when $a$, $c$ and/or $d$ are greater than 1, the groups R and $R^2$ can be the same or different.

The organosilicon compounds according to the present invention can be of general Formula II

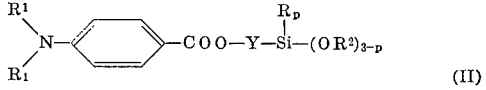

where R, $R^1$, $R^2$ and Y are as defined above, and $p$ is 0 to 3.

The organosilicon compounds containing one or more groups of Formula I in their molecule may also be linear, cyclic or three-dimensional organopolysiloxanes, and result from the repetition of the unit of general Formula III

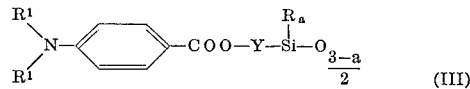

in which formulae R, $R^1$, Y and $a$ are as previously defined, optionally associated with a unit of the general Formula IV.

The linear or cyclic organopolysiloxanes result from the combination of the units of general Formula III in which $a$ is 1 or 2, optionally with units of general Formula IV in which $d$ is 1 or 2.

The three-dimensional organopolysiloxanes according to the present invention represent a combination of units of general Formula III in which $a$ is 0 alone or in association with units of general Formula IV in which $d$ is 0 to 2. It is also possible to obtain a three-dimensional configuration by the juxtaposition of units of general Formula IV in which $d$ is 0 or 1 and of units of general Formula III in which $a$ is 0 to 2.

R is preferably a methyl, ethyl, isopropyl, cyclohexyl, methylcyclopentyl, phenyl, methylphenyl or isopropylphenyl, benzyl radical. $R^2$ is preferably a methyl, ethyl or isopropyl group; $R^1$ is preferably a methyl group.

The above organosilicon compounds according to the present invention in which Y has at least 2 carbon atoms can be obtained by reacting an unsaturated ester of a p-dialkylaminobenzoic acid of the general Formula V

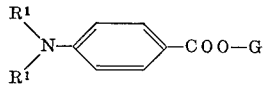

in which $R^1$ has the aforesaid meaning and G represents a monoethylenic hydrocarbon radical, such as vinyl or allyl, having up to 6 carbon atoms, in the presence of a catalyst with a monohydrosilane of general Formula VI

or with an organopolysiloxane containing at least one unit of general formula $$H-\underset{\underset{2}{\overset{R_a}{|}}}{Si}-O_{\frac{3-a}{2}}$$

alone or in association with units of general Formula IV, in which formula the symbols R, $R^1$, $R^2$, $a$ and $p$ are as hereinbefore defined.

This reaction may be carried out in the presence or absence of a solvent, which is inert to SiH groupings, for example, aliphatic hydrocarbons such as hexane or heptane, cycloaliphatic hydrocarbons such as cyclopentane or cyclohexane, or aromatic hydrocarbons such as benzene or toluene. The operating temperature is not critical but it is advantageously between 60° C. and 100° C. The catalysts employed are preferably derivatives or Group VIII metals, such as ruthenium or platinum derivatives, for example ruthenium acetylacetonate or hexachloroplatinic acid.

The monohydrosilanes mentioned above include more particularly the alkoxysilanes such as methyldiethoxysilane, dimethylethoxysilane, phenyldiethoxysilane, trimethoxysilane or triethoxysilane, and organopolysiloxanes containing —SiH groupings, such as tetramethyldisiloxane, pentamethyldisiloxane, 1,3,5-trimethylcyclotrisiloxane or 1,3,5,7-tetramethylcyclotetrasiloxane.

It is also possible to replace the silane of general Formula VI with a halosilane of general Formula VII $$H-\underset{\overset{R_p}{|}}{Si}-X_{3-p} \qquad (VII)$$

wherein X is a halogen atom and $p$ is 0 to 2 to form the addition compound of general Formula VIII $$R^i_2N-\!\!\!\bigcirc\!\!\!-COO-Y-\underset{\overset{R_p}{|}}{Si}-X_{3-p} \qquad (VIII)$$

which is also a compound of the present invention, and which is then treated with a monoalcohol to give a compound of general Formula II. This latter reaction is preferably carried out in the presence of an acid acceptor agent such as a tertiary amine.

Suitable halohydrosilanes are trichlorosilane, methyldichlorosilane, dimethylchlorosilane or phenyldichlorosilane.

Another method, which is particularly applicable to the preparation of compounds of general Formula II in which $p$ is 3 and of organopolysiloxanes containing units of general Formula III optionally associated with one or more units of general Formula IV, involves reacting a p-dialkylaminobenzoic acid, or the anhydride or chloride thereof, with a hydroxyalkylsilane of general formula HO—Y—SiR$_3$ or an organopolysiloxane containing one or more units of general formula $$HO-Y-\underset{\underset{2}{\overset{R_a}{|}}}{Si}-O_{\frac{3-a}{2}}$$

alone or in association with units of general Formula IV.

The esterification preferably employs a p-dialkylaminobenzoyl chloride such as p-dimethylaminobenzoyl chloride and the reaction is optionally carried out in an inert diluent such as benzene or toluene, in the presence or absence of an acid acceptor agent such as pyridine, for example. The temperature is not critical, but it is preferable to operate between 60° C. and 120° C.

Examples of suitable organopolysiloxanes are 1,3-bis-(hydroxymethyl) - tetramethyldisiloxane, β - (hydroxyethyl)-pentamethyldisiloxane or 1,3-bis - (γ - hydroxypropyl)-tetramethyldisiloxane.

The organopolysiloxanes of general Formula III may also be obtained by hydrolysing in known manner a compound of general Formula II in the presence or absence of a compound of the general Formula IX $$\underset{\overset{R_e}{|}}{Si}-(OR^2)_{4-e} \qquad (IX)$$

wherein $e$ is 1 to 3. Examples of the starting materials for this process are methyltriethoxysilane, dimethyldiethoxysilane, trimethylethoxysilane, diethyldiethoxysilane, triethylmethoxysilane, methylphenyldiethoxysilane, or diphenyldiethoxysilane.

Likewise, it is possible to obtain the above organopolysiloxanes by hydrolysis of a halosilane of general Formula VIII in the presence or absence of a halosilane as chain limiter and of an acid acceptor agent.

This halosilane of general Formula VIII may also be condensed with a silanol of the general formula $$\underset{\overset{R_f}{|}}{Si}-(OH)_{4-f}$$

in which $f$ is 2 or 3, or with an organopolysiloxane containing one or more units of general formula $$HO-\underset{\underset{2}{\overset{R_a}{|}}}{Si}-O_{\frac{3-a}{2}} \qquad (XVII)$$

alone or in association with units of general Formula IV to form the organopolysiloxanes according to the present invention. This reaction is preferably carried out in the presence of an acid acceptor agent.

The organosilicon compounds of general Formula I show ultra-violet absorption between 2600 A. and 3200 A. It is also known that such radiations are comprised within the solar spectrum and that they produce a cutaneous congestion, also called erythema. The organosilicon compounds according to the present invention, which in addition have substantially no inflammatory action, prove to be excellet anti-solar agents which may be employed for the protection of the human skin. The invention thus also provides a pharmaceutical or cosmetic composition comprising an effective amount of a compound of general Formula I.

In this application, in order to obtain an effective protection, it is preferable to employ organosilicon compounds containing at least one p-dialkylaminobenzoyloxyalkylsilyl group/100 silicon atoms.

The invention also provides a method of protecting a body from the effects of actinic light which comprises shielding the body with an effective amount of the above compound or composition.

These new organosilicon compounds having ester functions may also be employed in the various fillers commonly introduced into polymers in order to improve the cohesion between the filler and the polymer. In this respect, organoalkoxysilanes of Formula V and more particularly trialkoxysilanes may be employed as dressings for glass fabrics intended for the manufacture of laminates.

The following examples which are given purely by way of illustration, show how the invention may be put into practice. In these examples, the structure of the various products has been shown by nuclear magnetic resonance and infra-red spectrography.

EXAMPLE 1

1,1,3,3-tetramethyldisiloxane (7 g.), allyl p-dimethylaminobenzoate (26 g.), cyclohexane (30 cc.) and 0.2 g. of 10% hexachloroplatinic acid hexahydrate in isopropanol in a 100 cc. round-bottomed flask provided with a reflux condenser were heated under reflux for 40 min. and then cooled to ambient temperature and allowed to stand for about 12 hrs. The mixture was then stirred with animal charcoal (1 g.) and filtered. Elimination of the cyclohexane under reduced pressure gave a residue which slowly crystallised; recrystallisation from cyclohexane gave pure 1,3-bis-[γ-(p-dimethylaminobenzoyloxy)-propyl]-tetramethyldisiloxane (12 g.); M.P. 86° C., having the formula:

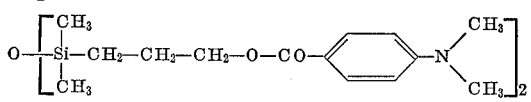

EXAMPLE 2

Vinyl p-dimethylaminobenzoate (85 g.) in cyclohexane (200 cc.) in a 500 cc. round-bottomed flask provided with a reflux condenser, a dropping funnel and a mechanical stirrer, was heated until dissolution was complete and then 0.4 g. of 10% hexachloroplatinic acid hexahydrate in isopropanol followed by methyldichlorosilane (55 g.) over 10 min. at a temperature of 70–80° C. were added; the mixture was refluxed for 50 min. and the temperature then was allowed to return to ambient temperature. Petroleum ether (150 cc.) was then added and the mixture cooled to about 0° C., filtered under nitrogen and then washed with petroleum ether (80 cc.). Drying at ambient temperature under a pressure of about 20 mm. Hg, gave, as white crystals, 2-(methyldichlorosilyl)-ethyl p-dimethylaminobenzoate (115 g.).

The above compound (92 g.) suspended in anhydrous diethyl ether (1000 cc.) at 0° C. to 10° C. in a 2 litre round-bottomed flask provided with a dropping funnel, a reflux condenser and a mechanical stirrer was treated through the dropping funnel with ethanol (35 g.), triethylamine (73 g.) over 1 hr. The reaction mixture was refluxed for one hour, cooled to ambient temperature, filtered and the precipitate washed with anhydrous diethyl ether (200 cc.); elimination of the ether in vacuo, and distillation at 180° C. under a pressure of 0.4 mm. Hg gave 2-(methyldiethoxysilyl)-ethyl p-dimethylaminobenzoate (58 g.); $n_D^{20}$=1.5270; $d_4^{20}$=1.057.

EXAMPLE 3

Allyl p-dimethylaminobenzoate (37 g.), cyclohexane (50 cc.) and 0.5 g. of 10% hexachloroplatinic acid hexahydrate in isopropanol in a 250 cc. round-bottomed flask provided with a reflux condenser and a dropping funnel was refluxed and treated with dimethylchlorosilane (17 g.) over 35 min.; the mixture was then refluxed for 1 hr., cooled to 5° to 10° C., and treated with triethylamine (20 g.) and then, over 40 minutes, with tetramethyldisiloxane-1,3-diol (15 g.) in anhydrous diethyl ether (50 cc.). After stirring for 2 hrs. at ambient temperature, distilled water (50 cc.) was added in order to dissolve the hydrochloride formed. The product was decanted and washed with N hydrochloric acid (50 cc.) to eliminate the excess of triethylamine and then with distilled water (3× 50 cc.).

The reaction mixture was degassed under a pressure of 0.3 mm. Hg up to a temperature of 130° C. to give an oil (57 g.) which crystallized on standing for 48 hours at normal temperature. Recrystallization from petroleum ether (100 cc.) gave, as white crystals, pure —1,7-bis[γ-(p-dimethylaminobenzoyloxy)-propyl] - octamethyl-tetrasiloxane (55 g.); M.P. 55° C., having the formula:

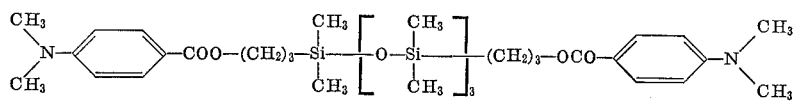

EXAMPLE 4

Allyl p-dimethylaminobenzoate (41 g.), cyclohexane (70 cc.) and 0.5 g. of 10% hexachloroplatinic acid hexahydrate in isopropanol, in a 250 cc. round-bottomed flask provided with a reflux condenser, a dropping funnel and a mechanical stirrer was heated with stirring to 60° to 70° C. Methyldichlorosilane (23 g.) was added over 20 mins. and the mixture then refluxed for 1 hr. After cooling to normal temperature, trimethylchlorosilane (11 g.) in cyclohexane (100 cc.) was added.

Polydimethylsiloxane - α,ω - diol (104 g.) (containing 8.2% by weight of hydroxyl groups), triethylamine (55 g.) and cyclohexane (300 cc.) in a one litre round-bottomed flask provided with a dropping funnel and a mechanical stirrer were cooled to 10° C. and the above mixture then added over 35 minutes. After stirring for about 2 hrs. at 25° C., water (80 cc.) was added. Decantation, washing with N hydrochloric acid (20× 50 cc.) and then distilled water (4× 50 cc.), further decantation, filtration and degassing under 0.8 mm. Hg up to a temperature of 80° C., gave an oil (119 g.) which, after filtration through animal charcoal, was clear and colourless, having a viscosity of 88 centipoises at 20° C. and containing 30% by weight of the groups:

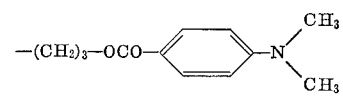

attached to the silicon atoms.

The oil was tested for anti-solar activity on a guinea pig by the method of C. V. Winder [Arch. Int. Pharmacodyn. 116, 261 (1968)]. When applied to the skin of the guinea pig 0.5 hr. before exposure to ultra-violet radiation, the oil exerted a complete protective action. In addition, the daily application of this oil for 9 consecutive days did not give rise to any inflammation.

EXAMPLE 5 p-Dimethylaminobenzoyl chloride (96 g.), in anhydrous benzene (300 cc.) in a 1 litre round-bottomed flask provided with a condenser, a dropping funnel and a mechanical stirrer was homogenised by heating at about 80° C., β-(hydroxyethyl)-pentamethyldisiloxane (96 g.) in pyridine (42 g.) was added over 45 mins., during which addition, the temperature was maintained between 75° and 80° C. without any outside supply of heat.

Stirring was then continued for a further 30 mins. and the mixture was then washed successively with water (150 cc.) 2 N sodium hydroxide (100 cc.) and water (3× 100 cc.). Decantation, separation of the benzene layer, drying (Na₂SO₄), evaporation of the benzene and degassing under a pressure of 0.3 mm. Hg up to 73° C. gave a colourless oil (132 g.) which partially crystallised. This mixture was stirred with pentane (400 cc.) and cooled to about 0° C. to give a precipitate which was filtered, washed with pentane (50 cc.) and dried, to give, as white crystals, pure β-(p-dimethylaminobenzoyloxy)ethyl-pentamethyldisiloxane (55 g.), melting point 92° C., having the Formula A

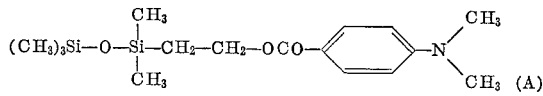 

The pentane of the filtrate was evaporated, and the residue distilled at 160° C. under 0.4 mm. Hg, to give a colourless oil (76 g.) which slowly crystallised (the melting point of the crystals being 30° C.) to give 1,3-bis[β-(p - dimethylaminobenzoyloxy) - ethyl] - tetramethyldisiloxane having the Formula B

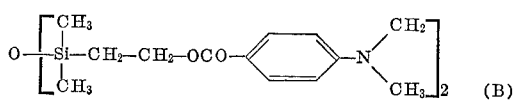

EXAMPLE 6

10% hydrochloric acid (15 g.) in a 125 cc. Erlenmeyer flask under a nitrogen atmosphere and provided with a magnetic stirrer and a dropping funnel was treated with 2-(methyldiethoxysilyl)ethyl p - dimethylaminobenzozate (15 g.) (obtained as in Example 2) and dimethyldiethoxysilane (15 g.) through the dropping funnel over 45 mins., the mixture being maintained at ambient temperature. Stirring for 1 hr. gave a homogeneous mixture which was distilled under atmospheric pressure to eliminate the water-ethanol azeotrope boiling at 78.3° C.; toluene (20 g.) was added to the distillation residue and the product was decanted after about 12 hrs.

The toluene layer was decanted and dried by filtration through anhydrous sodium sulphate and the toluene was removed by evaporation under reduced pressure, to give a clear oil (18 g.) whose viscosity was 2618 cst. at 25° C. and which still contained 3% by weight of ethoxy groups and 49.2% by weight of the groups

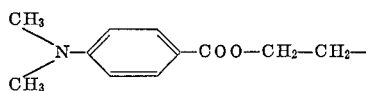

attached to the silicon atoms.

EXAMPLE 7

An organopolysiloxane oil (70 g.) containing 13.2% by weight of β-hydroxyethyl radicals and having a viscosity of 56 cst. at 25° C. (obtained by cohydrolysis of a mixture of trimethylchlorosilane, dimethyldichlorosilane and 1-trimethylsiloxy-2-methyldichlorosilyl ethane) in pyridine (20 g.) and anhydrous benzene (50 cc.) in a 1 litre round-bottomed flask provided with a reflux condenser, a double-jacketed dropping funnel and a mechanical stirrer was heated to 60–80° C. with vigorous stirring, and was then heated through the dropping funnel with p-dimethylaminobenzoyl chloride (37 g.) in anhydrous benzene (150 cc.) over 15 mins. The temperature was maintained at 70° C. by circulation of hot water through the double jacket of the dropping funnel throughout the addition.

The mixture was refluxed for 15 mins., cooled to ambient temperature and washed successively with distilled water (50 cc.), 2 N sodium hydroxide (50 cc.), 2 N hydrochloric acid solution (100 cc.) and distilled water (50 cc.). After elimination of the benzene by distillation under atmospheric pressure, the residue was degassed under 0.5 mm. Hg to a temperature of 80° C. to give, after standing for 3 days and filtration, a colourless organopolysiloxane oil (89 g.), in which all the hydroxyethyl groupings were esterified by p-dimethylaminobenzoic acid, and which absorbed ultra-violet radiation between 2800 A. and 3200 A. and has maximum absorption at 3100 A.

EXAMPLE 8

Allyl p-dimethylaminobenzoate (103 g.), cyclohexane (100 cc.), 0.5 g. of 10% hexachloroplatinic acid hexahydrate in isopropanol in a 500 cc. round-bottomed flask provided with a reflux condenser and a dropping funnel, was refluxed and treated over 65 mins. with dimethylchlorosilane (48 g.) and then was refluxed for a further 3 hrs.; the product was then allowed to stand for about 12 hrs. to give a solution which, in anhydrous diethyl ether (150 cc.), was added over 80 mins. to anhydrous diethyl ether (500 g.), triethylamine (103 g.) and water (9 g.) at a temperature 0° C. to 5° C. Trimethylchlorosilane (58 g.) was then added, and the temperature maintained at 0° to 5° C. for 1 hr. The temperature of the product was allowed to return to ambient temperature; the mixture was stirred for 5 hrs. and water (200 cc.) was added. The mixture was then decanted after stirring and the organic layer dried (CaSO₄). Evaporation of the solvents, filtration, and distillation of the filtrate under reduced pressure gave, at a temperature of 172° C. and 180° C. under a pressure of 0.4–0.6 mm. Hg, γ-(p-dimethylaminobenzoyloxy)propyl-pentamethyldisiloxane (120 g.); M.P. about 15° C.; $n_D^{20}=1.5123$; $d_4^{20}=0.995$; having the following formula:

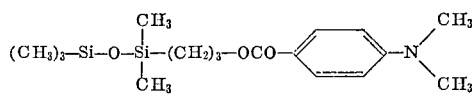

EXAMPLE 9

Allyl p-dimethylaminobenzoate (51 g.), cyclohexane (50 cc.), and 0.2 g. of 10% hexachloroplatinic acid hexahydrate in isopropanol, in a 250 cc. round-bottomed flask provided with a reflux condenser, a dropping funnel and a mechanical stirrer, was heated under reflux and then treated with dimethylchlorosilane (24 g.) over 50 mins. Refluxing was maintained for 3 hrs. and the product allowed to stand for about 12 hrs., and then diluted with ether (200 cc.); the mixture was then added, over 30 mins. with stirring, water/ice (500 g.). After decantation, collection of the ethereal layer, the aqueous layer was washed with diethyl ether (100 cc.). The ethereal solutions were combined, washed with distilled water (150 cc.) and then dried (Na₂SO₄). Elimination of the ether gave a pasty residue which crystallized slowly and which was taken up in petroleum ether (200 cc.) with good stirring. Filtration and drying of the precipitate gave, as white crystals, 1,3-bis-[γ-(p-dimethylaminobenzoyloxy)-propyl]-tetramethyldisiloxane (52 g.), melting point 86° C. having the formula:

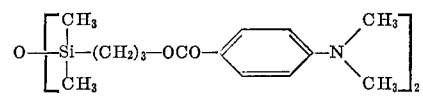

We claim:
1. An organosilicon compound containing one or more units of general formula

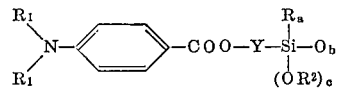

optionally associated, when b is greater than 1, with one or more units of general formula

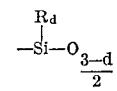

wherein R¹ is an alkyl group having up to 5 carbon atoms; Y is a divalent hydrocarbon group having up to 6 carbon atoms; R is an alkyl group having up to 5 carbon atoms, an unsubstituted or alkyl-substituted cycloalkyl group having 5 or 6 ring carbon atoms, an unsubstituted or alkyl-substituted aryl group, or an aralkyl group; R² is an alkyl group having up to 5 carbon atoms; a and c are 0 to 3; b is 0 when c is other than 0, and a and c are 0 to 3; b is 0 when c is other than 0, and $$\frac{3-a}{2}$$

when c it 0, a+c being 3 when b is 0; d is 0 to 2; and when a, c and/or d are greater than 1, the group R and R² can be the same or different.

2. A compound according to claim 1 of general formula

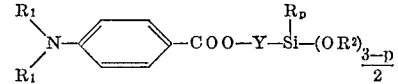

when c is 0, a+c being 3 when b is 0; d is 0 to 2; and p is 0 to 3.

3. A compound according to claim 1 which contains a repetition of a unit of general formula

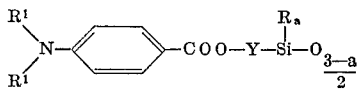

optionally associated, when $a$ is less than 3, with a unit of general formula

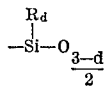

wherein R, $R^1$, Y, $a$ and $d$ are as defined in claim 1.

4. A compound according to claim 1 wherein Y is a propylene or ethylene group, and $R^1$ and R are methyl groups.

5. A compound according to claim 2, wherein R is a methyl group and $R^2$ is an ethyl group.

6. A compound according to claim 1 which is 1,3-bis-[γ - (p - dimethylaminobenzoyloxy)-propyl]-tetramethyldisiloxane.

7. A compound according to claim 1 which is 2-(methyldiethoxysilyl)-ethyl p-dimethylaminobenzoate.

8. A compound according to claim 1 which is 1,7-bis-[γ - (p - dimethylaminobenzoyloxy)-propyl]-octamethyltetrasiloxane.

9. A compound according to claim 1 which is β-(p-dimethylaminobenzoyloxy)-ethylpentamethyldisiloxane.

10. A compound according to claim 1 which is γ-(p-dimethylaminobenzoyloxy)-propylpentamethyldisiloxane.

11. An organohalosilane of general formula

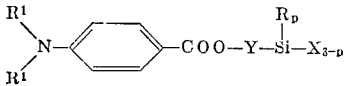

wherein R, $R^1$ and Y are as defined in claim 1, $p$ is 0 to 2 and X is a halogen atom.

References Cited

UNITED STATES PATENTS

| | | | |
|---|---|---|---|
| 2,783,263 | 2/1957 | Merker | 260—448.2 |
| 3,068,152 | 12/1962 | Black | 260—448.2 XR |
| 3,068,153 | 12/1962 | Morehouse | 260—448.2 XR |
| 3,296,196 | 1/1967 | Lamoreaux | 260—448.2 XR |

TOBIAS E. LEVOW, Primary Examiner

P. F. SHAVER, Assistant Examiner

U.S. Cl. X.R.

117—124; 260—448.8, 46.5, 37; 424—59